United States Patent Office 3,264,951
Patented August 9, 1966

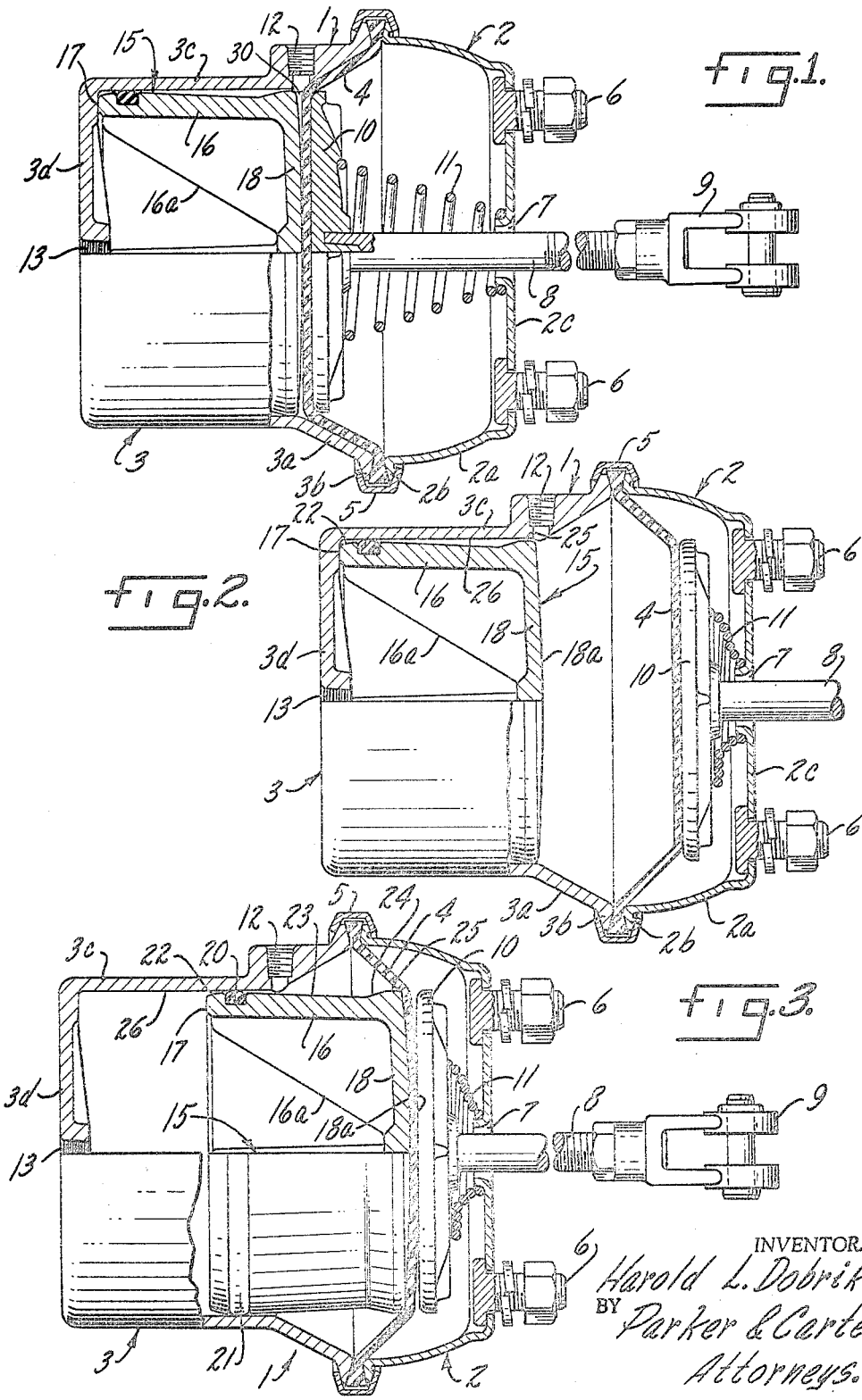

3,264,951
BRAKE ACTUATOR
Harold L. Dobrikin, Highland Park, Ill., assignor, by mesne assignments, to Berg Mfg. & Sales Co., Des Plaines, Ill., a corporation of Illinois
Filed Jan. 17, 1964, Ser. No. 338,392
7 Claims. (Cl. 92—64)

This invention relates to actuators and has particular relation to an actuator usable in controlling the brakes of a vehicle such as a tractor-trailer vehicle combination, for example.

One purpose of the invention is to provide a brake actuator of maximum simplicity in manufacture and operation.

Another purpose is to provide a brake actuator of maximum economy in manufacture.

Another purpose is to provide a brake actuator requiring a minimum number of seals.

Another purpose is to provide a brake actuator requiring a minimum of maintenance in the course of its use.

Another purpose is to provide a brake actuator having a minimum number of parts effective to accomplish both normal and emergency brake actuation.

Another purpose is to provide a brake actuator having both normal and emergency operating elements.

Another purpose is to provide a brake actuator having emergency elements which remain inoperative until required.

Another purpose is to provide an emergency operating element effective to serve additional functions.

Other purposes will appear from time to time during the course of the specification and claims.

The invention is illustrated more or less diagrammatically in the accompanying drawings wherein:

FIGURE 1 is a side elevation with parts in cross section and parts broken away;

FIGURE 2 is a view similar to that of FIGURE 1 but with parts in another position; and FIGURE 3 is a view similar to that of FIGURE 1 but with parts in still another position.

Like parts are indicated by like numerals throughout the specification and drawings.

In the drawings a brake actuator housing is designated generally by the numeral 1. The housing 1 is comprised of two generally cylindrical or shell-like portions 2, 3. The portion 2 has a curved conical wall 2a terminating at one edge in a peripheral lip designated at 2b and joining at its opposite edge an integral end wall 2c. The portion 3 has a conical wall portion 3a terminating at one edge in a peripheral lip 3b and joining at its opposite edge a cylindrical wall portion 3c, the latter terminating in an integral end wall 3d. Clamped between the lips 2b, 3b and extending across the entire area between the housing portions 2, 3 is a flexible diaphragm 4. A clamp ring 5 secures the lips 2b, 3b and the peripheral portion of diaphragm 4 therebetween to form the complete housing 1. Suitable fastener elements 6 extend through wall 2c for attachment of the housing to a suitable vehicle support element (not shown).

The housing wall portion 2c has a central aperture 7 through which a brake actuator rod 8 extends outwardly of housing 1. It will be understood that the outer end of rod 8 carries a clevis 9 which may be suitably connected to brake system elements (not shown) in a conventional, well-known manner. The clevis 9 or other suitable connector element may, for example, be secured to a conventional slack adjuster arm (not shown).

The inner end of rod 8, within housing 1, is secured to a pad 10. A relatively light return spring 11 has its opposite ends in engagement with a rear face of plate 10 and an opposed portion of the inner surface of housing wall portion 2c to urge the plate 10 into continuous engagement with one side of diaphragm 4.

The housing wall portions 3a, 3c have an inlet aperture 12 formed therein for reception of a suitable fitting (not shown). It is found convenient to position the inlet 12 at the juncture of portions 3a, 3c. It will be understood that the inlet 12 is formed and adapted for reception of a suitable conduit (not shown) of the normal service air system of the vehicle. It will be noted that inlet 12 is positioned in housing portion 3 to deliver fluid pressure to the opposite side of diaphragm 4 from that engaged by the plate 10.

The housing wall portion 3d has a central inlet aperture 13 formed therein, the inlet 13 being conveniently arranged coaxially with the cylinder defined by wall 3c and with the aperture 7 in the opposed housing portion 2. Inlet 13 is formed and adapted for reception of a suitable conduit (not shown) for delivery of emergency air pressure through inlet 13 and into the area within the cylinder formed by wall 3c.

Mounted for reciprocation within the cylinder formed by walls 3c and 3d is a piston 15. Piston 15 is of relatively elongated construction, having a cylindrical wall portion 16 of sufficient axial extension from the open, rear, circular edge 17 thereof to its opposite end which is closed by piston end wall 18, to bridge the space from the inner surface of wall 3d, against which piston edge 17 seats, to the surface of diaphragm 4 from that engaged by plate 10, against which piston end wall 18 seats when the diaphragm 4 is at rest, or in "brakes-off" position as illustrated in FIGURE 1.

Piston 15 is generally cup-shaped in over-all configuration, having its open end presented to inlet 13, its cylindrical wall 16 generally coterminous with the inner length of the chamber formed by wall 3c and ribs 16a joining walls 16 and 18.

The outer surface of piston wall 16 is grooved adjacent edge 17 as indicated at 20 and a seal ring 21 is carried in groove 20 for engagement with the inner surface of wall portion 3c. From the groove 20 the outer surface of wall 16 is tapered inwardly toward edge 17, as indicated at 22, and toward wall 18, as indicated at 23. Just prior to reaching wall 18, however, taper 23 is reversed to create an outward taper of flared surface 24. Surface 24 joins a substantially cylindrical surface 25 which is, in effect, bordering wall 18. As may be best seen at 26, the diameter of wall 18 is slightly less than the inner diameter of wall 3c and the surface 25 is thus free to "float" slightly within wall 3c.

It will be observed that the outer surface 18a of wall 18 is domed or concaved to provide for contact of only a central portion thereof when the diaphragm is at the "brakes-off" position of FIGURE 1. Since, in that position, diaphragm 4 is held against the flat, opposed surface of plate 10, a space 30 is presented to inlet 12 for ready reception of fluid pressure from inlet 12 between wall surface 18a and diaphragm 4. It will be further observed that surface 18a has its peripheral edge adjacent the opposite edge of inlet 12 from that approached by diaphragm 4 and that wall 18 serves, in normal operation, as a type of bulkhead or end wall for a service chamber formed by walls 2a, 2c and 3a.

The use and operation of the invention are as follows:

In normal operation air pressure delivered through inlet 12 enters space 30 and causes flexing of the diaphragm 4 toward the housing portion 2 to move the plate 10 and brake-operating rod 8 toward brakes-on position as shown in FIGURE 2. In such normal operation the piston 15 remains unaffected by the service pressure entering through inlet 12. Seal 21 precludes escape of such service pressure outwardly through inlet 13 and said pressure serves to retain piston 15 in its inactive position as shown in FIGURE 2.

Since the invention eliminates the need for a center wall or baffle between the emergency piston chamber and the service chamber, the entire structure of the housing has been rendered of lighter weight. Moreover, all requirement for a piston shaft or extension and consequent seal structure between such a shaft and baffle has been avoided.

Upon failure of the normal air pressure system, suitable automatically operable valving arrangements (not shown) may be provided on the vehicle for automatic delivery of emergency air pressure to inlet 13. Alternatively, manually operable valve elements (not shown) may be provided the vehicle operator for delivery of emergency air pressure to inlet 13. In either event the emergency air pressure entering through the inlet 13 operates against the rear face 18b of wall 18 and against piston 15 to move the piston 15 outwardly of the cylinder formed by walls 3c and 3d and to move the diaphragm 4 toward housing portion 2 and thus to move the plate 10 and brake-operating rod 8 toward brakes-on position, as shown in FIGURE 3, precisely in the manner in which elements 4, 10 and 8 are moved as above described with respect to the normal service air system. The seal 21 remains between inlets 13 and 12 at all times and thus precludes any cross-flow of fluid pressure therebetween.

When the operator desires to release the brakes from the "emergency on" position shown in FIGURE 3, it is only necessary to release the air pressure from behind piston 15. The return spring 11 is then effective to return rod 8, plate 10, diaphragm 4 and piston 15 to the "brakes-off" or arrest position shown in FIGURE 1 and the structure of the invention is ready for subsequent operation by either the normal or service system as illustrated in FIGURE 2 or again by the emergency system as illustrated in FIGURE 3.

It will be understood that housing portion 2 is relatively standard and conventional in a service chamber. Such chambers normally have a simple cover on the opposite side of diaphragm 4 with a pressure inlet in the cover. It will be noted that housing portion 3 of the invention can be substituted for such cover without requiring expensive changes in clamp ring 5 or the provision of spacers having inlets therein such as those required in double-diaphragm structures, for example. Similarly, piston 15 may remain at rest through many miles of vehicle operation without concern for the maintenance of flexibility or protection of an emergency diaphragm.

When piston 15 is at its fullest excursion, as shown in FIGURE 3, the seal 21 remains in sealing engagement with the inner surface of wall 3c. When piston 15 is returned to brakes-off position by spring 11 the flared surface 24 is free to engage the conical or similarly flared inner surface of wall 3a, the tapers 22 and 23 being designed to permit such engagement. The engagement of surface 24 and wall 3a serves to center piston 15 as it is returned to its seat against wall 3d, the piston 15, in effect, "floating" on its seal 21.

Whereas there has been shown and described an operative form of the invention, it should be understood that this showing and description are to be taken in an illustrative or diagrammatic sense only. There are many modifications in and to the invention which will be apparet to those skilled in the art and which will fall within the scope and spirit of the invention. The scope of the invention should, therefore, be limited only by the scope of the hereinafter appended claims.

There is claimed:

1. A brake actuator comprising a housing, said housing having a cylindrical portion, an outwardly flared portion joining said cylindrical portion, a diaphragm closing said outwardly flared portion, a chamber portion on the opposite side of said diaphragm, a brake rod reciprocal in said chamber portion, a plate carried by said brake rod for engagement with one surface of said diaphragm, a return spring engaging said plate and said chamber portion and positioned to urge said diaphragm toward said cylindrical portion, a piston having a length substantially equal to the length of said cylindrical portion and reciprocally mounted in said cylindrical portion, a service pressure inlet positioned in said housing to deliver fluid pressure to the opposite side of said diaphragm, an emergency pressure inlet positioned to deliver fluid pressure to the opposite side of said piston from said diaphragm, said piston having a seal ring carried in its outer surface for engagement with the inner surface of said cylindrical portion, the outer cylindrical surface of said piston being tapered in opposite directions away from said seal and having an outwardly flared portion adjacent said diaphragm for centering engagement with said flared housing portion when said piston is moved away from said chamber.

2. A brake actuator comprising a housing, a diaphragm dividing said housing, a brake-operating rod engaging one side of said diaphragm, a service inlet in said housing positioned to deliver fluid pressure to the opposite side of said diaphragm, a cylinder formed in said housing on said opposite side of said diaphragm, a piston reciprocal in said cylinder, an emergency inlet in said housing postioned to deliver fluid pressure to said piston and to urge said piston directly against and into contact with said opposite side of said diaphragm, a flared housing portion joining said cylinder, said piston having a flared portion adjacent said opposite side of said diaphragm for centering engagement with said flared housing portion when said piston is moved toward said emergency inlet.

3. A brake actuator comprising a housing, a diaphragm dividing said housing, a brake-operating rod engaging one side of said diaphragm, a service inlet in said housing positioned to deliver fluid pressure to the opposite side of said diaphragm, a cylinder formed in said housing on said opposite side of said diaphragm, a piston reciprocal in said cylinder, an emergency inlet in said housing positioned to deliver fluid pressure to said piston and to urge said piston directly against and into contact with said opposite side of said diaphragm, a seal carried by said piston, said seal engaging the inner walls of said cylinder at all positions of said piston, said seal being between said service and emergency inlets at all positions of said piston, said piston having its outer cylindrical surface tapered in opposite directions from said seal whereby said piston is caused to float within said cylinder.

4. A brake actuator comprising a housing, a diaphragm dividing said housing, a brake-operating rod engaging one side of said diaphragm, a service inlet in said housing positioned to deliver fluid pressure to the opposite side of said diaphragm, a cylinder formed in said housing on said opposite side of said diaphragm, a piston reciprocal in said cylinder, an emergency inlet in said housing positioned to deliver fluid pressure to said piston and to urge said piston directly against and into contact with said opposite side of said diaphragm, said piston being seated against the rear end wall of said cylinder when said brake-operating rod is in brakes-off position, said diaphragm being clamped between said brake rod and said piston when said brake rod is in brakes-off position, said piston having a domed end surface engaging said diaphragm, a flat plate carried by said brake rod and engaging the opposite surface of said diaphragm, said surface pressure inlet being positioned in alignment with the point of engagement of said piston and said diaphragm when said brake rod is in brakes-off position.

5. A brake actuator comprising a housing, a diaphragm dividing said housing, a brake-operating rod engaging one side of said diaphragm, a service inlet in said housing positioned to deliver fluid pressure to the opposite side of said diaphragm, a cylinder formed in said housing on said opposite side of said diaphragm, a piston reciprocal in said cylinder, an emergency inlet in said housing positioned to deliver fluid pressure to said piston and to urge said piston directly against and into contact with said opposite side of said diaphragm, said piston having an axial length substantially equal to the axial length of said cylinder, said piston having a diameter slightly less than that of said cylinder, a seal carried by said piston for engagement with the inner surface of said cylinder, the outer surface of said piston being tapered in opposite directions away from said seal whereby said piston is caused to float within said cylinder.

6. A brake actuator comprising a housing, a diaphragm dividing said housing, a brake-operating rod engaging one side of said diaphragm, a service inlet in said housing positioned to deliver fluid pressure to the opposite side of said diaphragm, a cylinder formed in said housing on said opposite side of said diaphragm, a piston reciprocal in said cylinder, an emergency inlet in said housing positioned to deliver fluid pressure to said piston and to urge said piston directly against and into contact with said opposite side of said diaphragm, said piston having an axial length substantially equal to the axial length of said cylinder, said piston having a diameter slightly less than that of said cylinder, a seal carried by said piston for engagement with the inner surface of said cylinder, the outer surface of said piston being tapered in opposite directions away from said seal whereby said piston is caused to float within said cylinder, said piston having an outwardly flared portion in the outer surface thereof adjacent the end wall of said piston, said housing having a flared portion joining said cylinder for engagement by said piston flared portion when said piston is moved toward said emergency inlet.

7. A brake actuator comprising a housing, a diaphragm dividing said housing, a brake-operating rod engaging one side of said diaphragm, a service inlet in said housing positioned to deliver fluid pressure to the opposite side of said diaphragm, a cylinder formed in said housing on said opposite side of said diaphragm, a piston reciprocal in said cylinder, an emergency inlet in said housing positioned to deliver fluid pressure to said piston and to urge said piston directly against and into contact with said opposite side of said diaphragm, said piston being cup-shaped, the open end of said piston being presented to said emergency inlet, the closed end of said piston engaging said diaphragm when said broke-operating rod is in brakes-off position, the closed end surface of said piston being domed, said service inlet being positioned in said housing in alignment with the domed portion of said piston when said piston is seated whereby fluid pressure may be delivered to a peripheral space between said piston and said diaphragm when said brake-operating rod is in brakes-off position.

References Cited by the Examiner

UNITED STATES PATENTS

| | | | |
|---|---|---|---|
| 2,452,176 | 10/1948 | Bent | 92—64 X |
| 2,726,738 | 12/1955 | Fawick. | |
| 2,873,579 | 2/1959 | Safford | 92—63 X |
| 2,962,000 | 11/1960 | Alfieri | 92—63 |
| 2,983,257 | 5/1961 | Euga | 92—48 |
| 3,064,685 | 11/1962 | Washnock | 92—50 |
| 3,093,115 | 6/1963 | Alfieri | 92—63 |
| 3,112,959 | 12/1963 | Kateley | 92—63 X |
| 3,183,791 | 5/1965 | Cruse | 92—64 X |

EDGAR W. GEOGHEGAN, *Primary Examiner.*

RICHARD B. WILKINSON, SAMUEL LEVINE,
*Examiners.*

H. G. SHIELDS, *Assistant Examiner.*